United States Patent
Maldonado et al.

(10) Patent No.: US 9,850,883 B1
(45) Date of Patent: Dec. 26, 2017

(54) APPARATUS AND METHOD FOR GENERATING ELECTRICITY FROM INTEGRATED AIR FLOWS AND THERMAL ENERGY

(71) Applicant: Bajaura S.A. DE C.V., Chula Vista, CA (US)

(72) Inventors: Diego Moreno Maldonado, Baja California (MX); Diego Moreno Garcia, Baja California (MX)

(73) Assignee: Bajaura S.A. DE C.V., Chula Vista, CA (US)

( * ) Notice: Subject to any disclaimer, the term of this patent is extended or adjusted under 35 U.S.C. 154(b) by 0 days.

(21) Appl. No.: 15/674,420

(22) Filed: Aug. 10, 2017

(51) Int. Cl.
| | | |
|---|---|---|
| *F01D 15/10* | (2006.01) | |
| *F02C 6/00* | (2006.01) | |
| *F03G 6/04* | (2006.01) | |
| *H02K 7/18* | (2006.01) | |
| *F03G 6/00* | (2006.01) | |

(52) U.S. Cl.
CPC ............. *F03G 6/045* (2013.01); *F01D 15/10* (2013.01); *H02K 7/1823* (2013.01); *F03G 2006/008* (2013.01)

(58) Field of Classification Search
CPC .......... F03G 6/045; F01D 15/10; F03D 9/007; F03D 9/35; H02S 10/12
USPC .......................................... 290/52
See application file for complete search history.

(56) References Cited

U.S. PATENT DOCUMENTS

| | | | |
|---|---|---|---|
| 2,595,905 | A | 5/1952 | Maria |
| 2,677,664 | A | 5/1954 | Maria |
| 4,119,084 | A | 10/1978 | Eckels |

(Continued)

FOREIGN PATENT DOCUMENTS

| | | |
|---|---|---|
| CN | 201711025 | 1/2011 |
| CN | 102797651 A1 | 11/2012 |

(Continued)

OTHER PUBLICATIONS

Anisur et al., "Latent Heat Thermal Storage (LHTS)for Energy Sustainability", Energy Sustainability through Green Energy, Green Energy and Technology, pp. 245-263, 2015.

(Continued)

*Primary Examiner* — Tulsidas C Patel
*Assistant Examiner* — Thomas Quigley
(74) *Attorney, Agent, or Firm* — Fish & Richardson P.C.

(57) ABSTRACT

Methods and apparatus, for generating electricity from airflow and thermal energy. In one aspect, an electricity generating apparatus includes a housing including a double-walled section containing a thermal salt to store heat and form a pressure chamber within the housing, a collector coupled with the housing and including two or more inlet channels configured to direct ambient air into the pressure chamber, and a nozzle coupled with the housing configured to direct a convection current of air into the pressure chamber, and a turbine including a rotor and a stator to generate electricity from air flow through the pressure chamber, the rotor having an aerodynamic rotor case and convergent blades and the stator having an aerodynamic stator case and divergent blades, and where the double-walled section containing the thermal salt surrounds at least a portion of the collector and surrounds a portion of the turbine.

16 Claims, 10 Drawing Sheets

(56) References Cited

U.S. PATENT DOCUMENTS

| | | | |
|---|---|---|---|
| 4,149,520 | A | 4/1979 | Arent |
| 4,150,547 | A | 4/1979 | Hobson |
| 4,233,961 | A | 11/1980 | Kelly |
| 4,273,100 | A | 6/1981 | Cogliano |
| 4,286,141 | A | 8/1981 | MacCracken |
| 4,303,058 | A | 12/1981 | Chun |
| 4,382,437 | A | 5/1983 | Woods, Jr. et al. |
| 4,411,255 | A | 10/1983 | Lee |
| 4,509,503 | A | 4/1985 | Young |
| 4,532,917 | A | 8/1985 | Taff et al. |
| 4,677,903 | A | 7/1987 | Matthews, III |
| 6,590,300 | B1 * | 7/2003 | Preito Santiago ........ F03D 1/04 290/44 |
| 2005/0103327 | A1 | 5/2005 | Lee et al. |
| 2008/0054085 | A1 | 3/2008 | Case |
| 2009/0212570 | A1 * | 8/2009 | Le ........................ F03D 9/007 290/52 |
| 2010/0101621 | A1 | 4/2010 | Xu |
| 2010/0218496 | A1 | 9/2010 | Miles |

FOREIGN PATENT DOCUMENTS

| | | |
|---|---|---|
| CN | 104410171 A1 | 3/2015 |
| DE | 10 2006 022 788 | 11/2007 |
| ES | F02C1/05 | 9/2017 |
| ES | F03D1/02 | 9/2017 |
| ES | F24J2/00 | 9/2017 |
| MX | 2015006190 A1 | 10/2015 |

OTHER PUBLICATIONS

Sharma et al., "Review on thermal energy storage with phase change materials and applications", Renewable and Sustainable Energy Reviews, vol. 13, Issue 2, Feb. 2009, pp. 318-345.

* cited by examiner

APPARATUS AND METHOD FOR GENERATING ELECTRICITY FROM INTEGRATED AIR FLOWS AND THERMAL ENERGY

BACKGROUND

Renewable energy is energy collected from renewable resources, including ambient air (e.g., wind), sunlight, geothermal heat, and tidal forces. Various electricity-generation systems may be used to collect one or more of the renewable resources, for example, wind turbines for collecting wind kinetic energy or solar panels for collecting photovoltaic energy, and then convert the renewable energy sources into usable electricity. Electricity-generation systems may integrate multiple renewable resources to leverage maximal energy captured by the system.

SUMMARY

This specification describes technologies relating to the generation of electricity using airflows and thermal energy.

In general, one innovative aspect of the subject matter described in this specification can be embodied in an electricity generating apparatus including a housing having a double-walled section containing at least a thermal salt to store heat so as to form a pressure chamber within the housing. The electricity generating apparatus also includes a collector coupled with the housing and includes two or more inlet channels and a nozzle, where the inlet channels are configured and arranged to direct ambient air into the pressure chamber within the housing, and the nozzle is configured and arranged to direct ambient air (e.g., wind) into the pressure chamber within the housing. The nozzle is configured and arranged to direct a convection current of air rising from below the electricity generating apparatus into the pressure chamber within the housing. Additionally, the electricity generating apparatus includes a turbine to generate electricity from air flow through the pressure chamber, where the turbine is coupled with the housing and includes a rotor and a stator. The rotor includes an aerodynamic rotor case and convergent blades around the aerodynamic rotor case. The stator includes an aerodynamic stator case and divergent blades around the aerodynamic stator case. The double-walled section containing at least the thermal salt surrounds at least a portion of the collector and surrounds at least a portion of the turbine.

These and other embodiments can each optionally include one or more of the following features. In some implementations, the turbine comprises two or more magnets and two or more coils oriented with respect to each other to generate electricity as the rotor rotates with respect to the housing and the stator. The two or more magnets and the two or more coils can be located within the aerodynamic stator case and can be coaxial with the stator.

In some implementations, the divergent blades of the stator are a first number of blades, the convergent blades of the rotor are a second number of blades, the rotor is coaxial with the stator, and the first number and the second number are two sequential numbers in the Fibonacci sequence. The first number of blades can be 8 blades, and the second number of blades can be 13 blades. In some implementations, a ratio of the second number of blades to the first number of blades ranges between 1.5-2.0.

In some implementations, a spacing between a top edge of a divergent blade of the divergent blades of the stator and a bottom edge of a nearest convergent blade of the convergent blades of the rotor is equal to a length of the divergent blade divided by an integer multiple of the Golden Ratio.

In some implementations, the turbine includes a crankshaft coupled with the rotor, the aerodynamic stator case contains an electric generator to generate the electricity, and the aerodynamic stator case also contains a gearbox coupling the crankshaft with the electric generator. Gearing of the gearbox can be selectable responsive to an estimate of a thermal gradient with the pressure chamber and/or can be selectable responsive to an estimate of airflow through the pressure chamber.

In some implementations, a stator assembly includes a conical nosepiece and exterior walls of (i) the conical nosepiece, (ii) the stator case, and (iii) the rotor case, where each forms an angle with a vertical direction of the electricity generating apparatus that is an integer multiple of 15 degrees.

In some implementations, the housing has an hourglass shape, where the double-walled section of the housing has interior walls that each form an angle that is an integer multiple of 15 degrees. A portion of the double-walled section of the housing containing the thermal salts can extend from a point below a smallest circumference point of the hourglass shape of the housing to a point above the smallest circumference point of the hourglass shape of the housing.

In some implementations, the double-walled section containing at least a thermal salt is configured such that heat is generated with solar radiation impinges upon the double-walled section of the housing and is stored in the thermal salt. The portion of the double-walled section containing the thermal salt can be selected to generate a thermal gradient within at least a portion of the housing. The thermal salt used can be a Glauber's salt.

In some implementations, the two or more inlet channels are defined by collector blades arranged and configured to form the two or more inlet channels in the apparatus.

Other embodiments of this aspect include corresponding methods for generating electricity by an electricity generating apparatus including generating by a thermal salt contained within a double-walled section of a housing, a thermal gradient within the housing. The generation of the thermal gradient includes absorbing thermal energy by thermal salt contained within the double-walled section of the housing, storing the thermal energy by the thermal salt through a first phase transition from a solid to a liquid, and releasing the stored thermal energy by the thermal salt through a second phase transition from liquid to solid. A pressure chamber within the housing is established in part by the thermal gradient generated within the housing. Ambient air is collected by a collector coupled with the housing and two or more inlet channels from an ambient surrounding the housing. A convection current of air rising from below the collector is collected by the collector coupled with the housing and a nozzle. The collector, the two or more inlet channels, and the nozzle direct the collected ambient air and convection current of air into an air flow through the pressure chamber within the housing. Electricity is generated by a turbine including a rotor and a stator coupled with the housing from the air flow through the pressure chamber within the housing, where the rotor includes an aerodynamic rotor case and convergent blades around the aerodynamic rotor case, and the stator includes an aerodynamic stator case and divergent blades around the aerodynamic stator case, and where the double-walled section containing at least the thermal salt surrounds at least a portion of the collector, and the double-walled section containing at least the thermal salt surrounds at least a portion of the turbine.

Particular embodiments of the subject matter described in this specification can be implemented so as to realize one or more of the following advantages. Integrating the electricity generator inside the stator case improves performance and efficiency, as well as reduces a number of parts required in manufacturing the apparatus. The aerodynamic and compact design (e.g., aerodynamic rotor case and aerodynamic stator case) simplifies manufacturing, reduces manufacturing costs, and produces a relatively lightweight solar and ambient air power generation apparatus. The design of the apparatus, including the use of Venturi angles and one or more geometric ratios (e.g., the Golden ratio) in the layout of the apparatus, results in improved conversion efficiency between air flow and electricity in part by reducing drag and friction of the air flow currents through the apparatus, and allows for operation at low wind speeds (e.g., wind speeds as low as 1.9 meters/second). Incorporating a gearbox into the design of the apparatus, where the gearing is selectable responsive to an estimated airflow and/or estimated thermal gradient within the apparatus, results in improved conversion efficiency between air flow and electricity generation in part by matching relative speeds of an electric generator and a crankshaft of the apparatus.

Incorporating a thermal salt into the external housing creates an enhanced thermal gradient within the housing that can increase air flow past the turbine, and which can continue operating as ambient temperatures drop (e.g., at night). Additionally, selecting a portion of the external housing containing the thermal salt to extend from a point below a smallest circumference of the housing to a point above the smallest circumference of the house (e.g., where the housing is an hourglass shape), extends the region within the apparatus where a pressure chamber is formed within the housing of the apparatus. Selecting a number of convergent blades for the rotor and a number of divergent blades for the stator of the turbine using the Fibonacci sequence can result in improved pairing of the respective blades and increased airflow currents past the turbine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Described below are apparatus and methods for generating electricity from airflow and thermal energy. An exemplary apparatus includes an outer housing where the housing has a double-walled portion containing a thermal salt (e.g., Glauber's salt) that stores heat within the double-walled portion of the housing. The heat stored by the thermal salt can create a thermal gradient within the housing of the apparatus, generating a pressure chamber (e.g., a low-pressure region and a high-pressure region) within the apparatus. A collector is coupled with the housing and includes inlet channels for directing ambient air (e.g., wind) into the pressure chamber formed in the housing. The collector also includes a nozzle, which directs convection currents created by air rising from below the apparatus (e.g., building exhaust) into the pressure chamber formed in the housing. Both types of collected airflow are then directed towards a turbine, including a rotor and a stator, which can generate electricity by turning a crankshaft that is attached to the rotor inside the turbine. The rotor and stator each have a set of blades, where the rotor has a set of convergent blades and the stator has a set of divergent blades. The respective sets of blades are designed to maximize airflow through the turbine. The double-walled portion containing the thermal salt extends from a lower portion of the housing that surrounds the collector, up through an upper portion of the housing that surrounds the turbine.

These features and additional features are described in more detail below.

Example Apparatus Configuration

Figure 1A:
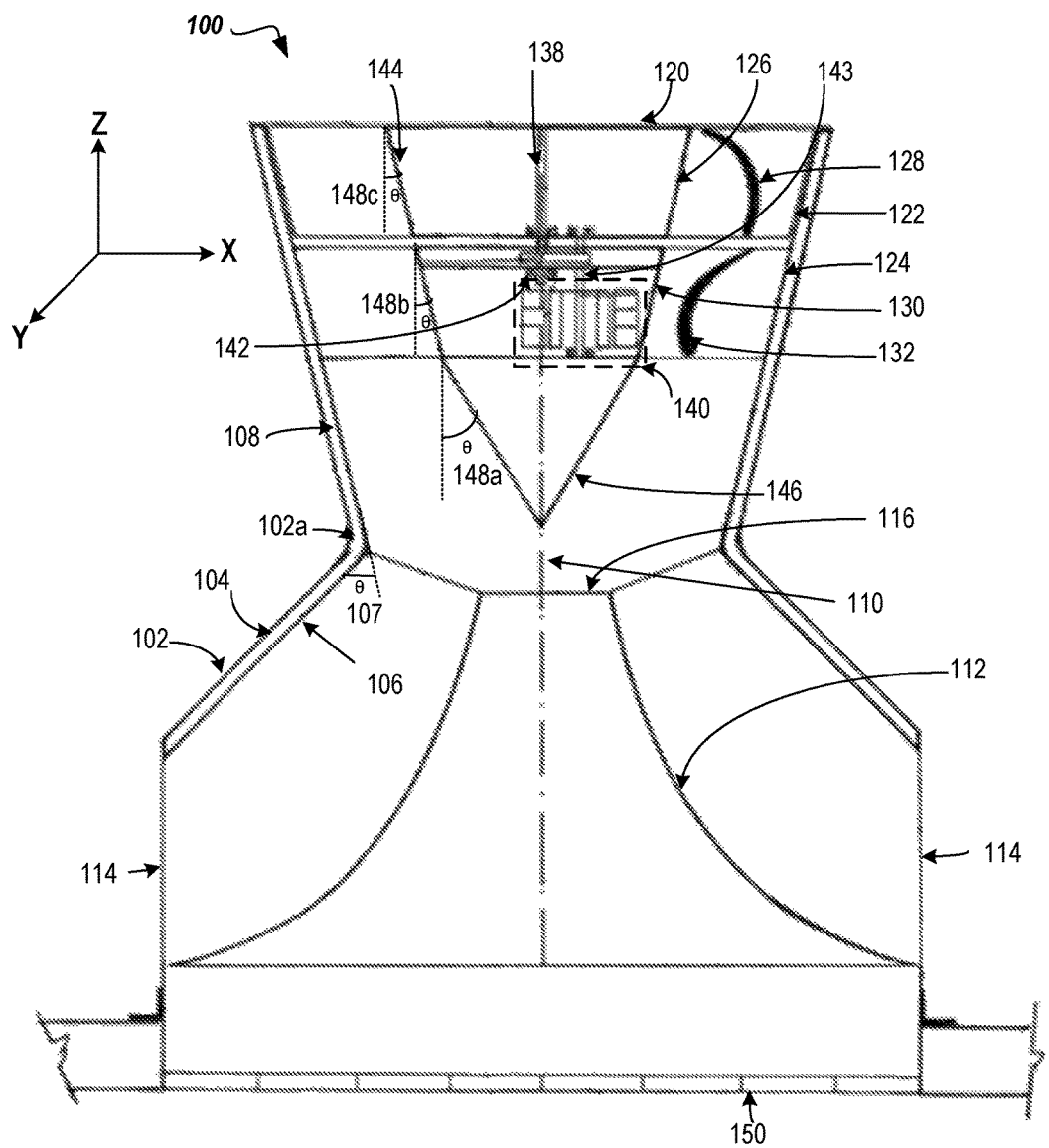
FIG. 1A shows an internal schematic of an example of an ambient air and thermal energy electricity-generation apparatus.

FIG. 1A shows an internal schematic of an example of an ambient air and thermal electricity-generation apparatus 100. A housing 102 includes a double-walled section 104. The housing 102 and double-walled section 104 can be manufactured of a same or of different materials including aluminum, steel, copper, metallic alloy, or another thermally conductive material (e.g., a thermally conductive plastic). The double-walled section 104 and the housing 102 can be assembled to one another (e.g., riveted, bolted, welded, or glued) and/or integrally formed (e.g., molded or extruded). In some implementations, the housing 102 has an hourglass shape. The double-walled section 104 of the housing 102 can have interior wall 106 forming an angle 107. Angle 107 can be an integer multiple of a Venturi angle (e.g., integer multiples of 15 degrees) with respect to the housing 102.

In some implementations, the double-walled section 104 of the housing 102 extends from a point below a smallest circumference 102a of the hourglass shape of the housing 102 to a point above the smallest circumference 102a of the hourglass shape of the housing.

The double-walled section 104 of the housing 102 can contain at least a thermal salt 108, such as a Glauber's salt or another composition that can be used in molten salt energy storage. The amount of thermal salt 108 located within the double-walled section 104 can depend on a particular application of the apparatus. In some implementations, the thermal salt 108 is located within a portion of the double-walled section 104 from a point below the smallest circumference 102a of the housing 102 to a point above the smallest circumference 102a of the housing 102. In some implementations, the thermal salt 108 is located within a portion of the double-walled section 104 below the smallest circumference 102a of the housing 102. In some implementations, the thermal salt 108 is located within a portion of the double-walled section 104 above the smallest circumference 102a of the housing 102. In some implementations, the thermal salt 108 is located within the entire double-walled section 104 of the housing 102.

The thermal salt 108 within the double-walled section 104 of the housing 102 can be used to generate a thermal gradient within the housing 102. For example, a thermal gradient within the housing 102 can be generated when the double-walled section of the housing 102 containing the thermal salt 108 is heated by a thermal radiation and/or solar radiation source and/or exposed to any other heat source. The thermal salt 108 absorbs heat energy (e.g., solar thermal energy, exhaust from a HVAC system, building exhaust heat, etc.) and can undergo a phase transition from a solid phase to a liquid phase, storing thermal energy within the molten thermal salt. The molten thermal salt releases (as thermal radiative energy) as the thermal salt transitions from liquid phase back to a solid phase when the ambient temperature in contact with the thermal salt 108 is below the temperature of the thermal salt 108 (e.g., until it reaches a thermal equilibrium point).

The thermal salt 108 can produce a thermal gradient within at least a portion of the housing 102 as it releases stored heat into the surrounding double-walled section 104 of the housing 102. In some implementations, the conductive material(s) used for the double-walled section 104 and the housing 102 cause the heating of the double-walled section 104 to heat at least a portion within the housing 102. The thermal gradient produced within at least a portion of the housing 102 can form a pressure chamber 110 within the housing 102, which is described in more detail herein with reference to FIGS. 4 and 5. Example temperature ranges of the thermal gradient include 33-70° Celsius. Pressure chamber 110 can include a pressure differential from a lower portion to an upper portion of the apparatus 100.

A collector 112, depicted in FIG. 1A, is coupled with the housing 102 and includes one or more inlet channels 114 and a nozzle 116. The collector 112 is oriented with respect to the housing 102 such that at least a portion of the collector 112 is surrounded by the double-walled section 104.

The inlet channels 114 are configured and arranged to direct ambient air from an ambient external to the housing 102 into the pressure chamber 110. In some implementations, the inlet channels 114 are defined by collector blades 118 (shown in FIG. 1B) which are arranged and configured with respect to the housing 102 and the collector 112 to form inlet channels 114.

The nozzle 116 is configured and arranged to direct a convection current of air or airflow rising from below the ambient air and thermal electricity-generation apparatus 100 into the pressure chamber 110 within the housing 102. Convection currents of air can include building exhaust, exhaust from HVAC systems, building exhaust heat (including building thermal behavior and human activity), geothermal vents, or the like. In some implementations, the convection currents of air are a high temperature and the ambient temperature surrounding the housing 102 is a low temperature such that the airflow is vertical through the ambient air and thermal electricity-generation apparatus 100.

The collector 112, collector blades 118, and nozzle 116 can be manufactured of a same or of different materials including aluminum, steel, copper, metallic alloy, or another thermally conductive material (e.g., a thermally conductive plastic). The collector 112, collector blades 118, and/or nozzle 116 can be assembled to one another (e.g., riveted, bolted, welded, or glued) and/or integrally formed (e.g., molded or extruded). The collector 112, collector blades 118, and/or nozzle 116 can also be assembled to and/or formed with the housing 102 and/or double-walled section 104.

A turbine 120, shown in FIG. 1A, is positioned within the housing 102 to generate electricity from airflow through the pressure chamber 110. Turbine 120 is coupled with the housing 102 (e.g., attached or mounted to the housing). Turbine 120 includes a rotor 122 and a stator 124. In some implementations, the rotor 122 and the stator 124 are coaxial. Turbine 120 is positioned within the housing 102 such that at least a portion of the turbine is surrounded by the double-walled portion 104.

The rotor 122 includes an aerodynamic rotor case 126 and a set of convergent blades 128 arranged around the aerodynamic rotor case 126. The convergent blades 128 can be assembled to (e.g., riveted, bolted, welded, or glued) and/or integrally formed with the aerodynamic rotor case 126. The stator includes an aerodynamic stator case 130 and a set of divergent blades 132 arranged around the aerodynamic stator case 130. The divergent blades 132 can be assembled to (e.g., riveted, bolted, welded, or glued) and/or integrally formed with the aerodynamic stator case 130. The components of the turbine 120, including the rotor 122 and stator 124 can be manufactured of same or of different materials including aluminum, steel, copper, metallic alloy, or another thermally conductive material (e.g., a thermally conductive plastic).

In some implementations, the divergent blades 132 of the stator 124 are comprised of a first number of blades B(S), and the convergent blades 128 of the rotor 122 are comprised of a second number of blades B(R). The number of blades B(S) and B(R) can be selected according to the Fibonacci sequence. For example, the values for B(S) and B(R) can be sequential numbers in the Fibonacci sequence (e.g., B(S)=5 and B(R)=8; B(S)=8 and B(R)=13; B(S)=13 and B(R)=21; B(S)=21 and B(R)=34). In some implementations, the values for B(S) and B(R) are selected based on a ratio of B(R) to B(S). For example, the ratio of B(R) to B(S) can range between 1.5-2.0 (e.g., B(R)=17 and B(S)=10 so that B(R)/B(S)=1.7). Configurations of the divergent blades 132 and the convergent blades 128 are described in more detail with reference to FIG. 3 below.

In some implementations, the turbine 120 depicted in FIG. 1A includes magnets 134 and coils 136 oriented with respect to each other to generate electricity as the rotor 122 rotates with respect to the housing 102 and the stator 124 (as shown in FIG. 1A). The magnets 134 and coils 136 can be located within the aerodynamic stator case 130 and can be coaxial with the stator 124. The magnets 134 can be permanent magnets comprised of any conventional magnetic material, such as neodymium. The coils can be composed of metallic wire including copper. Although turbine 120 is described herein as using magnetic/coils for energy generation, other forms of magnet-free energy generation are also compatible with apparatus 100.

In some implementations, the turbine 120 includes a crankshaft 138 coupled with the rotor 122. The crankshaft 138 can be coaxial through its longitudinal axis with the rotor 122 and is caused to rotate about its longitudinal axis during operation of the rotor 122. The crankshaft 138 can rotate at a same or at a different speed (number of revolutions/minute) as the rotor. For example, the crankshaft 138 rotates at the same speed as the rotor 122 when the crankshaft 138 is directly attached to the rotor 122. The crankshaft 138 can also be geared with respect to the rotor 122 such that the speed of the crankshaft 138 is a geared fraction of the speed of the rotor 122. For example, the crankshaft 138 can be geared up or geared down relative to the rotor 122.

In some implementations, the aerodynamic stator case 130 shown in FIG. 1A includes an electric generator 140 to generate electricity as the crankshaft 138 and the rotor 122 rotate. In some implementations, the electric generator 140 can include magnets 134 and coils 136 for generating electricity. The aerodynamic stator case 130 can also include a gearbox 142, which is coupled to the electric generator 140 by a generator shaft 143. The gearing of the gearbox 142 can be selected based on an estimate of airflow through the pressure chamber 110. For example, a low gear ratio can be selected for faster ambient air speeds (e.g., 3:1 or less between rotor rotational speed to electric generator rotational speed) and a high gear ratio can be selected for slower ambient air speeds (e.g., 5:1 or more between rotor rotational speed to electric generator rotational speed).

In some implementations, the gearing of the gearbox 142 shown in FIG. 1A can be selected based on an estimate of a thermal gradient within the pressure chamber 110. The thermal gradient within the pressure chamber 110 affects an internal air flow speed past the turbine, such that a proper gearing ratio is desired such that the rotor speed of the rotor 122 sufficiently matches (e.g., match within a speed threshold) the electric generator speed of the electric generator. For example, a gearing ratio can be selected to slow down the rotor speed of the rotor 122 to match an optimal generator speed of the electric generator (e.g., to a generator speed that optimizes power generation).

In some implementations, a stator assembly 144 shown in FIG. 1A incorporates a portion or the entire turbine 120. The stator assembly 144 can include a conical nosepiece 146, the aerodynamic stator case 130 and the aerodynamic rotor case 126. The stator assembly 144 is designed to maximize airflow from the pressure chamber 110 past the divergent blades 132 of the stator 124 and the convergent blades 128 of the rotor 122. The exterior walls of the conical nosepiece 146, the aerodynamic stator case 130 and the aerodynamic rotor case 126 each form an angle, for example, angles 148a, 148b, 148c, with respect to a vertical direction of the apparatus 100. Each angle 148a, 148b, 148c can be equal to an integer multiple of the Venturi angle (e.g., an integer multiple of 15 degrees).

In some implementations, a grille 150, shown in FIG. 1A, is attached to a bottom portion of the apparatus 100, and can cover a portion or the entire bottom of the collector 112. The grille 150 can be used to prevent contamination (e.g., dust particles, waste from exhaust, etc.) from entering into the apparatus 100.

Figure 1B:
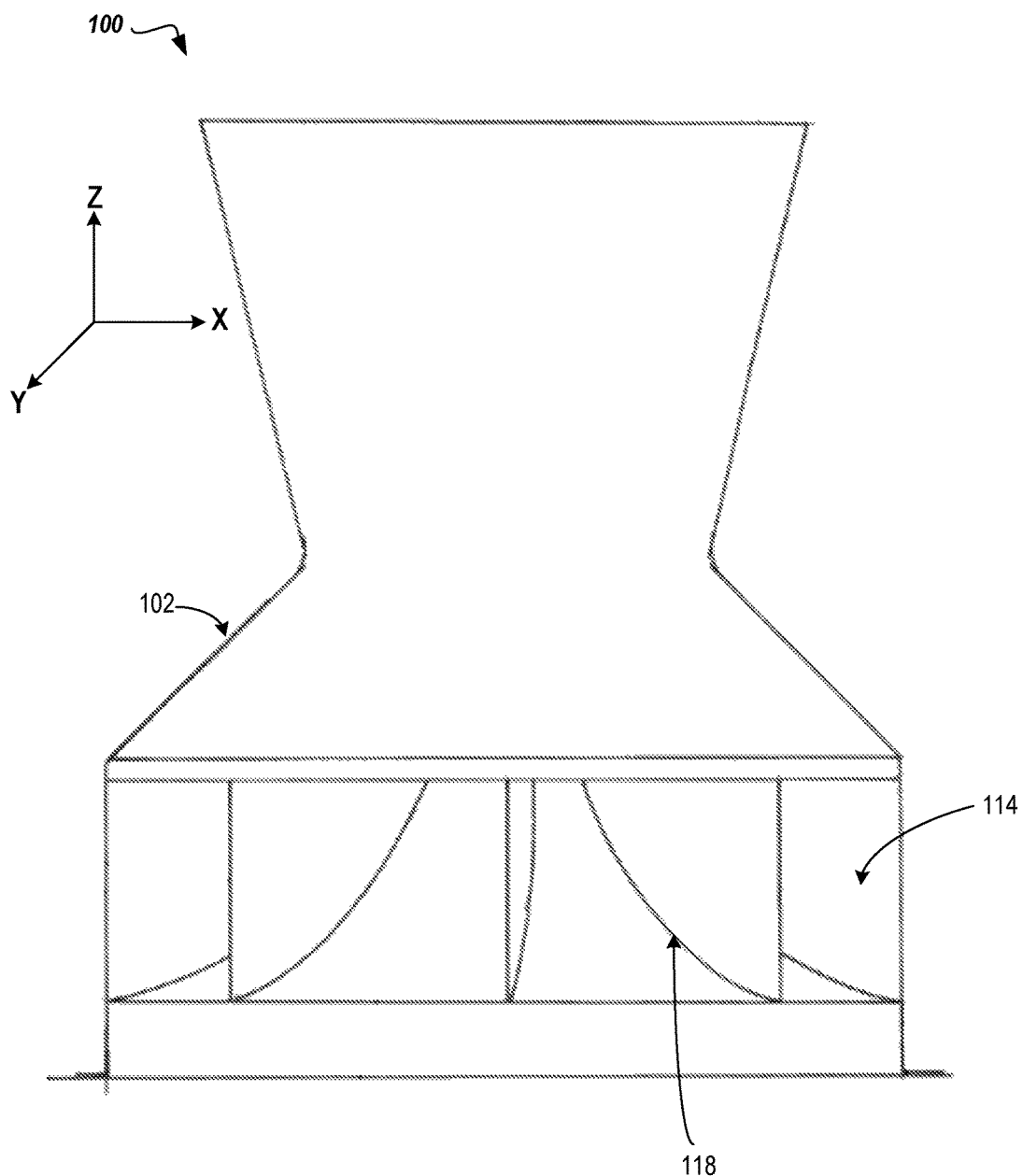
FIG. 1B shows an external schematic of an example of an ambient and thermal energy electricity-generation apparatus.

FIG. 1B shows an external schematic of an example of an ambient air and thermal electricity-generation apparatus 100. Housing 102 surrounds at least a portion of the apparatus 100. Inlet channels 114 can be defined by a set of collector blades 118 positioned around the apparatus 100 such that ambient air (e.g., wind) is funneled from the outside into the apparatus 100.

Figure 2A:
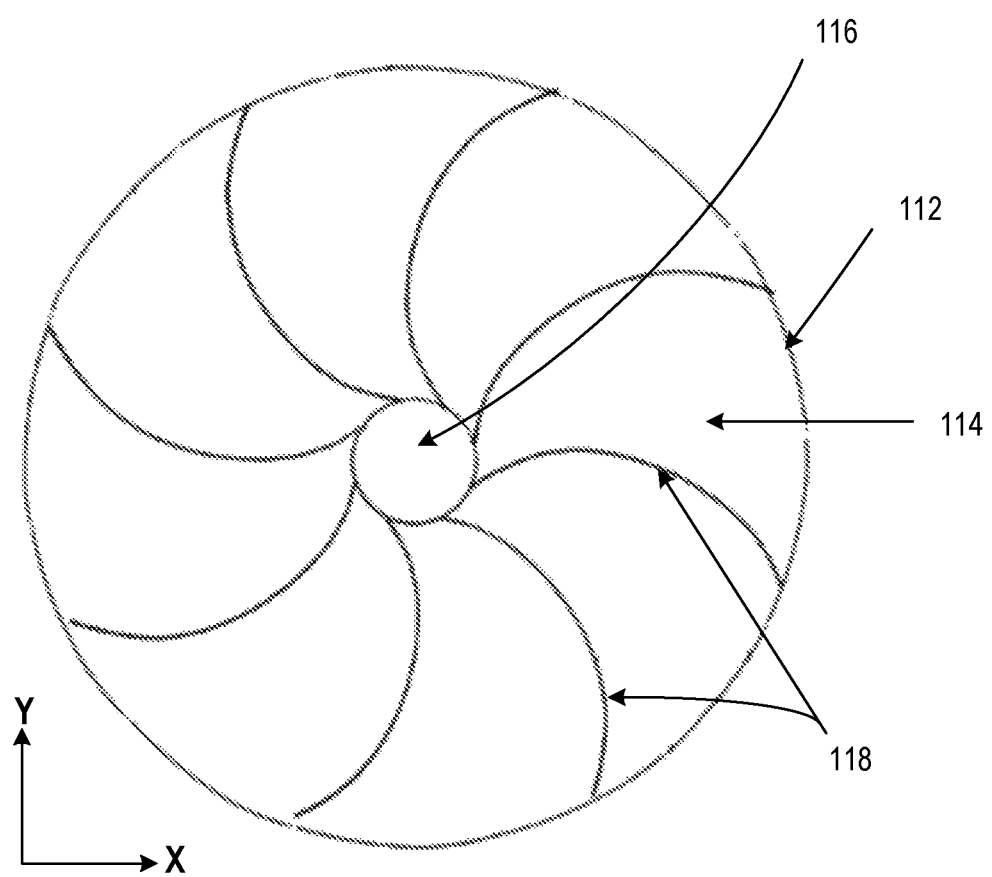
FIGS. 2A-2F show schematics of various parts of an example ambient air and thermal electricity-generation apparatus.

FIGS. 2A-2F show schematics of various parts of an example ambient air and thermal electricity-generation apparatus 100. FIG. 2A shows an example cross-sectional view of the collector 112 and inlet channels 114 defined by collector blades 118 for apparatus 100. The nozzle 116 at the center of the collector 112 has an opening through which the collected convection current of air rising from below the collector 112 passes.

Figure 2B:
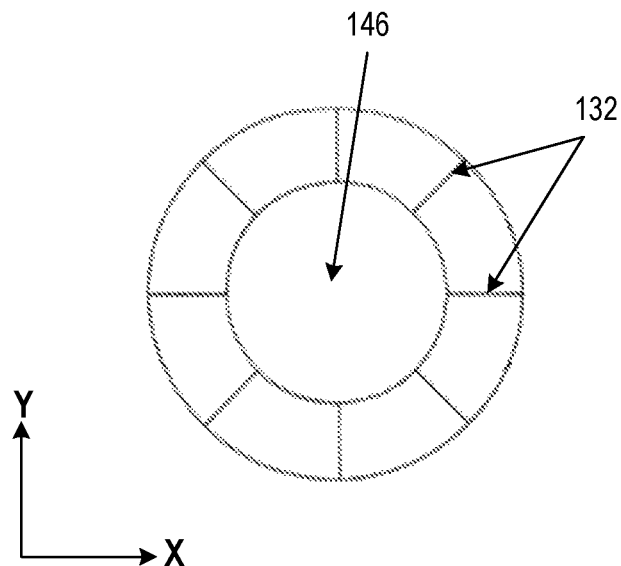

FIG. 2B shows an example cross-sectional view of the conical nosepiece 146 and stator divergent blades 132 of the stator 124 for apparatus 100.

Figure 2C:
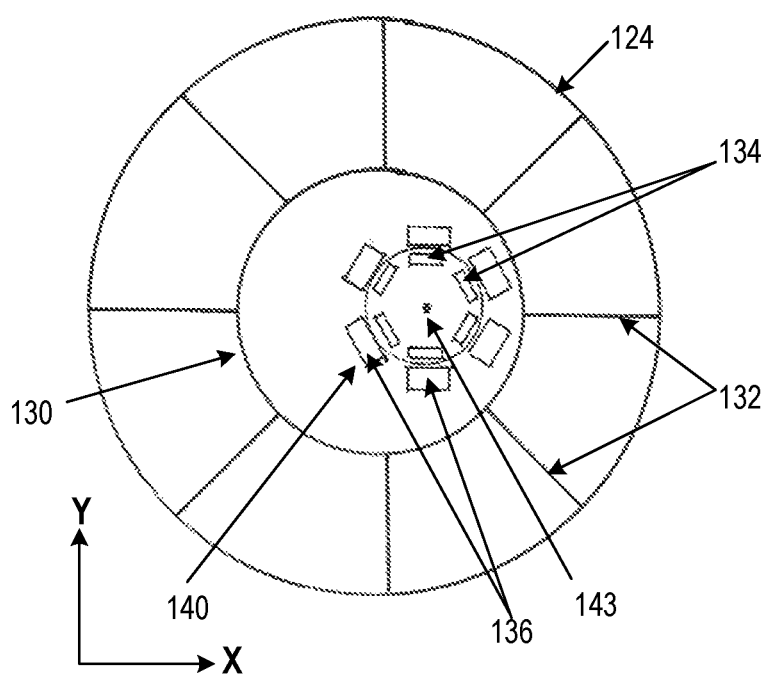

FIG. 2C shows an example cross-sectional view of the aerodynamic stator case 130, the divergent blades of the stator 132 around the aerodynamic stator case 130, the electrical generator 140, and an attachment point for the generator shaft 143 for apparatus 100. In some implementations, the electrical generator 140 includes magnets 134 (e.g., 4, 6, or 8 magnets) and coils 136 (e.g., 4, 6, or 8 coils), such that a number of magnets 134 and a number of coils 136 match. The magnets 134 can be stationary relative to the crankshaft 138, such that the coils 136 rotate with the crankshaft 138. In another implementation, the coils 136 can be stationary relative to the crankshaft 138, such that the magnets 134 rotate with the crankshaft 138.

Figure 2D:
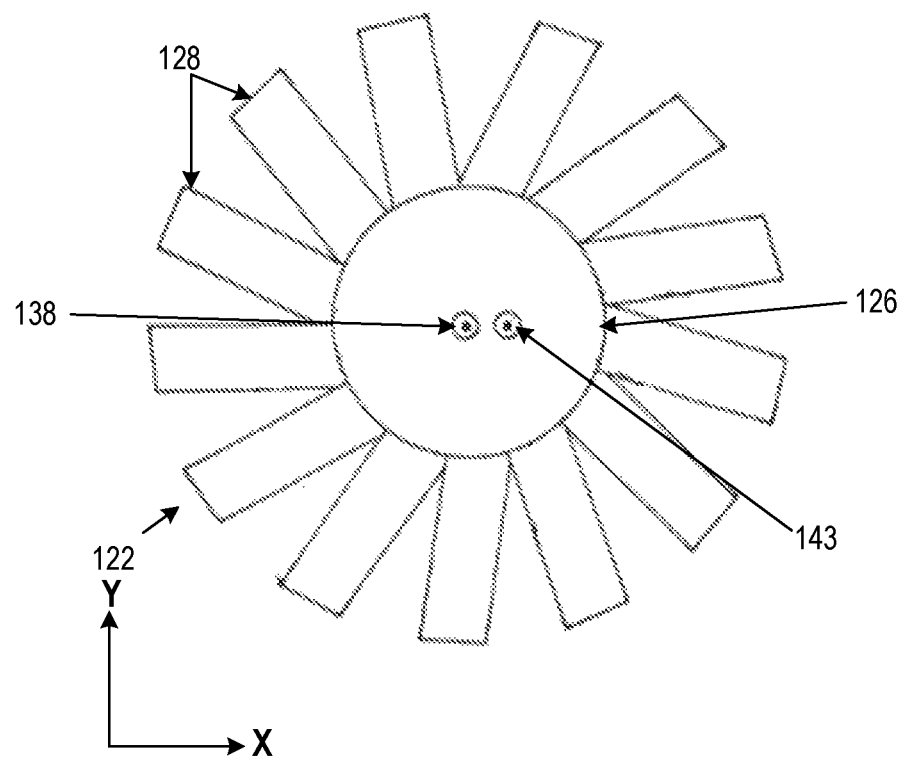

FIG. 2D shows an example cross-sectional view of the aerodynamic rotor case 126, the convergent blades 128 of the rotor 122 around the aerodynamic rotor case 126, generator shaft 143 and crankshaft 138 for apparatus 100.

Figure 2E:
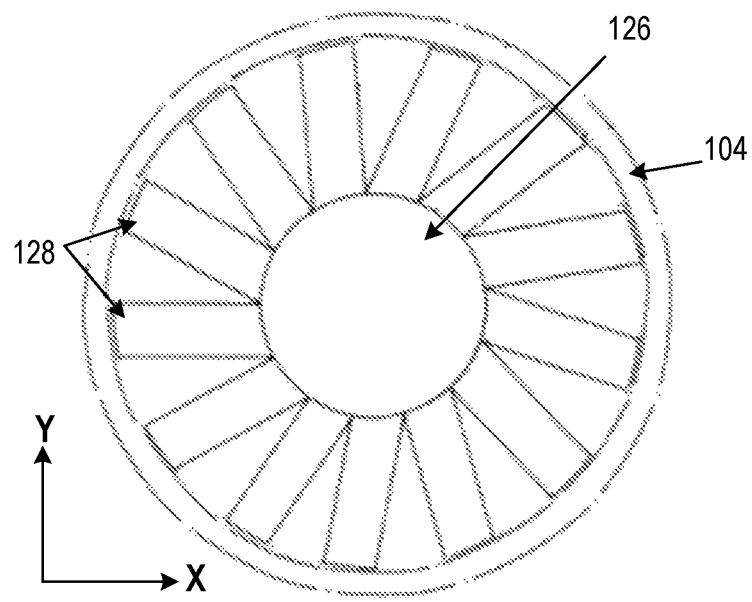

FIG. 2E shows an example cross-sectional view of the double-walled section 104 containing the thermal salt 108, the convergent blades 128 of the rotor 122, and a cover for the aerodynamic rotor case 126 for apparatus 100.

Figure 2F:
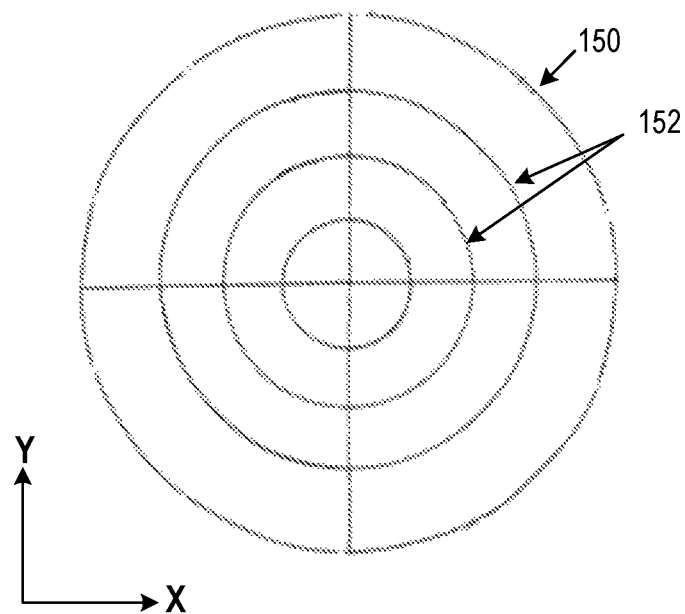

FIG. 2F shows an example cross-sectional view of a grille 150 at an inlet of apparatus 100. In some implementations, the grille 150 is adjustable. For example, grille 150 can include multiple fins or baffles 152 that can adjust an amount of airflow at the inlet of the apparatus 100 through the collector by adjusting a position of the fins or baffles 152 relative to the grille 150. In some implementations, the grille 150 can include a filter, a mesh, or wire grid, for example.

Figure 3:
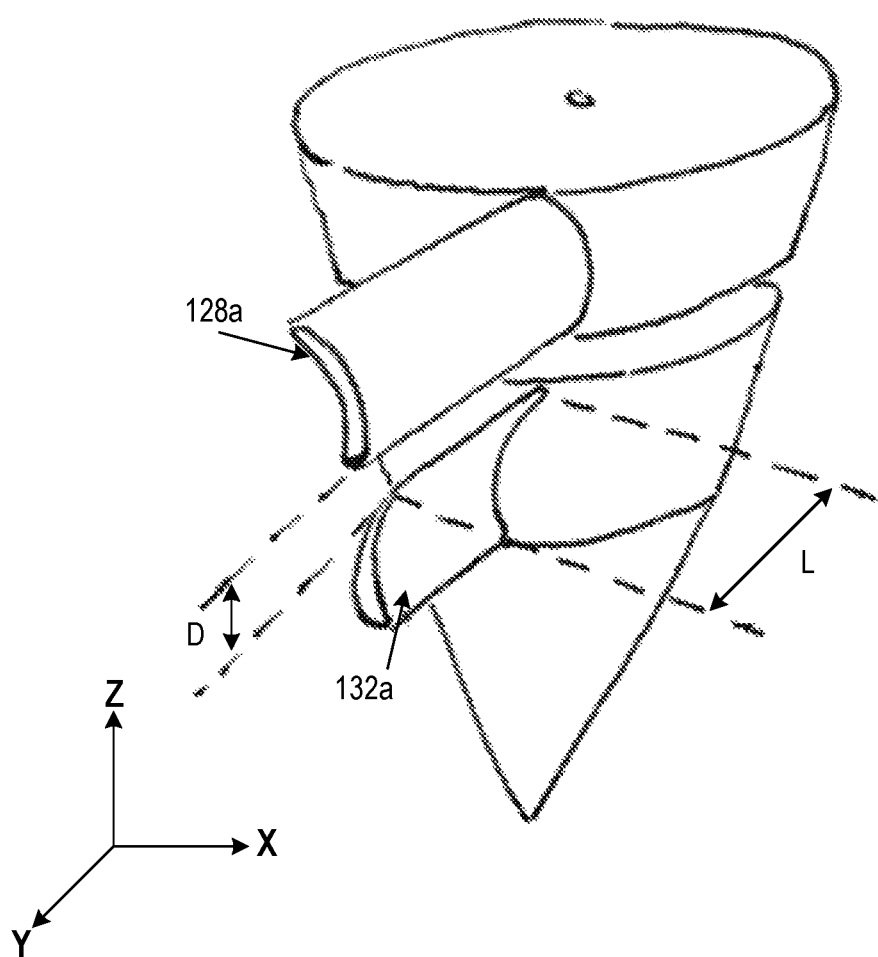
FIG. 3 shows an example schematic of the divergent blades of the stator oriented with respect to the convergent blades of the rotor for apparatus.

In some implementations, a spacing between a top edge of a divergent blade of the divergent blades 132 of the stator 124 and a bottom edge of a nearest convergent blade of the convergent blades 128 of the rotor 122 is equal to an integer multiple of a geometric ratio (e.g., the Golden Ratio) multiplied by a length of the divergent blade. FIG. 3 shows a schematic of an example of a divergent blade 132a of the divergent blades of the stator 124 oriented with respect to a convergent blade 128a of the convergent blades 128 of the rotor 122 for apparatus 100. For example, divergent blade 132a has a length L and a spacing D between the top of divergent blade 132a and a nearest convergent blade 128a, such that $D=L/(A*1.618)$, where A is an integer. Lengths of the divergent blades 132 and convergent blades 128 scale with the dimensions of the apparatus 100. In one example, given a divergent blade 132a with a length L=10 centimeters, a spacing D between divergent blade 302 and convergent blade 128a can be selected using an integer multiple of 1.618. In this example, if the integer multiple A=2, the spacing D=3.09 centimeters.

Example Process for Generating Electricity Using Apparatus

Figure 4:
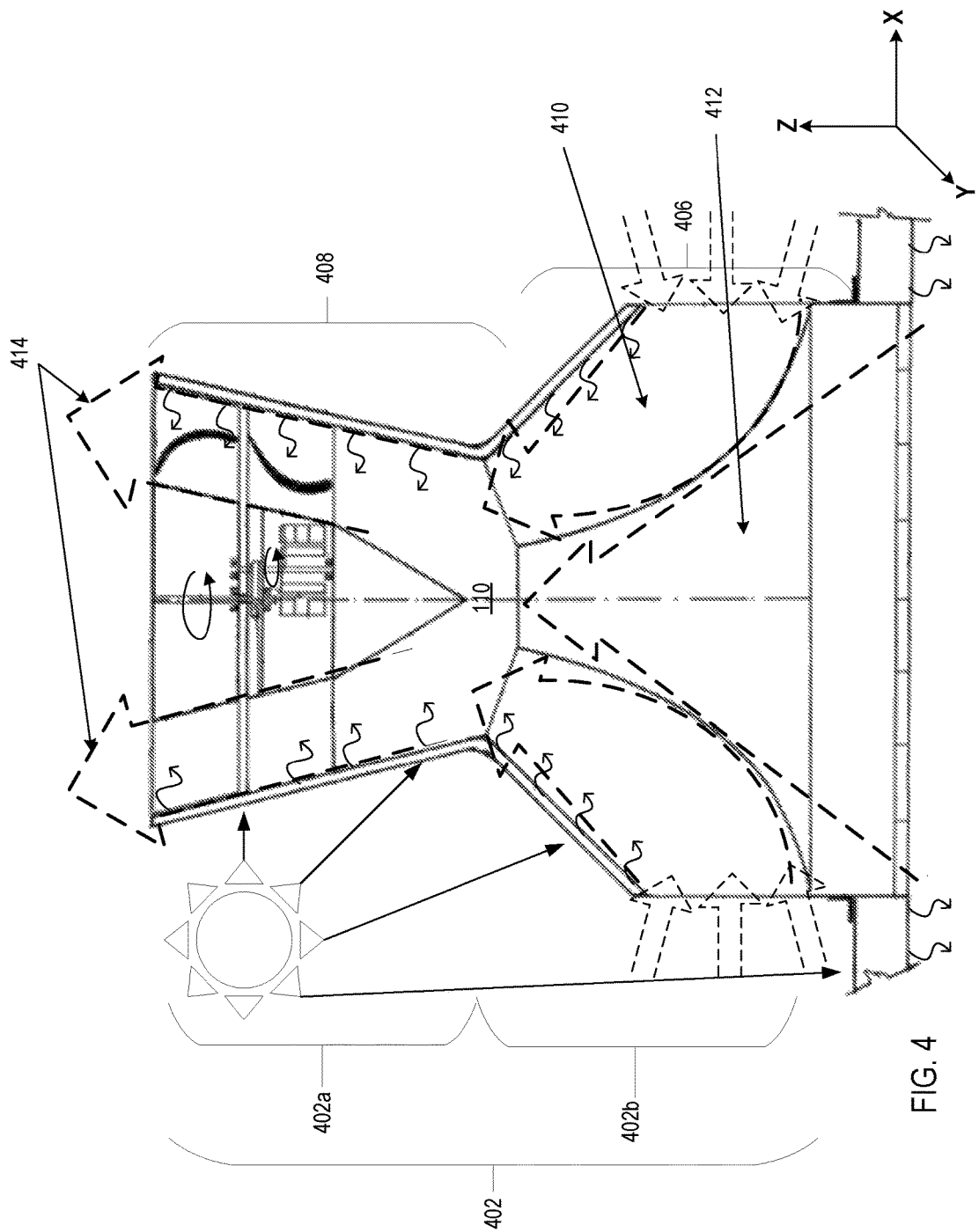
FIG. 4 is a schematic showing example airflow paths through an example ambient air and thermal electricity-generation apparatus.

FIG. 4 is a schematic showing an airflow path through exemplary ambient air and thermal electricity-generation apparatus 100 A thermal gradient 402 is generated within the housing 102. In some implementations, the thermal gradient 402 has a high temperature zone 402a and a low temperature zone 402b within the housing 102. The respective high and low temperature portions of the housing 102 depend in part on the location of the thermal salt 108 within the double-walled portion of the housing 102. Pressure chamber 110 is established within the housing 102, at least in part, by the thermal gradient 402. In some implementations, the pressure chamber 110 includes a high-pressure to low-pressure differential, where a high pressure zone 406 is in a lower portion of the housing 102 and a low pressure zone 408 is in an upper portion of the housing 102.

An air flow path 410 directs air from outside the device through inlet channels 114, past an outer wall of the collector 112 into pressure chamber 110. Airflow path 412 directs air from below the apparatus 100 through an inner wall of the collector 112 into pressure chamber 110. Airflow paths 410 and 412 lead to the pressure chamber 110, where airflow is directed from the airflow paths 410 and 412 through the pressure chamber 110 upwards past the conical nosepiece 146 and into the turbine 120 before exiting the apparatus 100 with an outlet airflow 414.

In some implementations, a particular local direction of airflow through the turbine 120 region is determined in part by a curvature of the respective blades at each stage of the turbine 120. For example, the divergent blades 132 of the stator 124 direct the airflow outwards towards the housing 102 and the convergent blades 128 of the rotor 122 direct the airflow away from the housing 102 towards the center of the apparatus 100.

Figure 5:
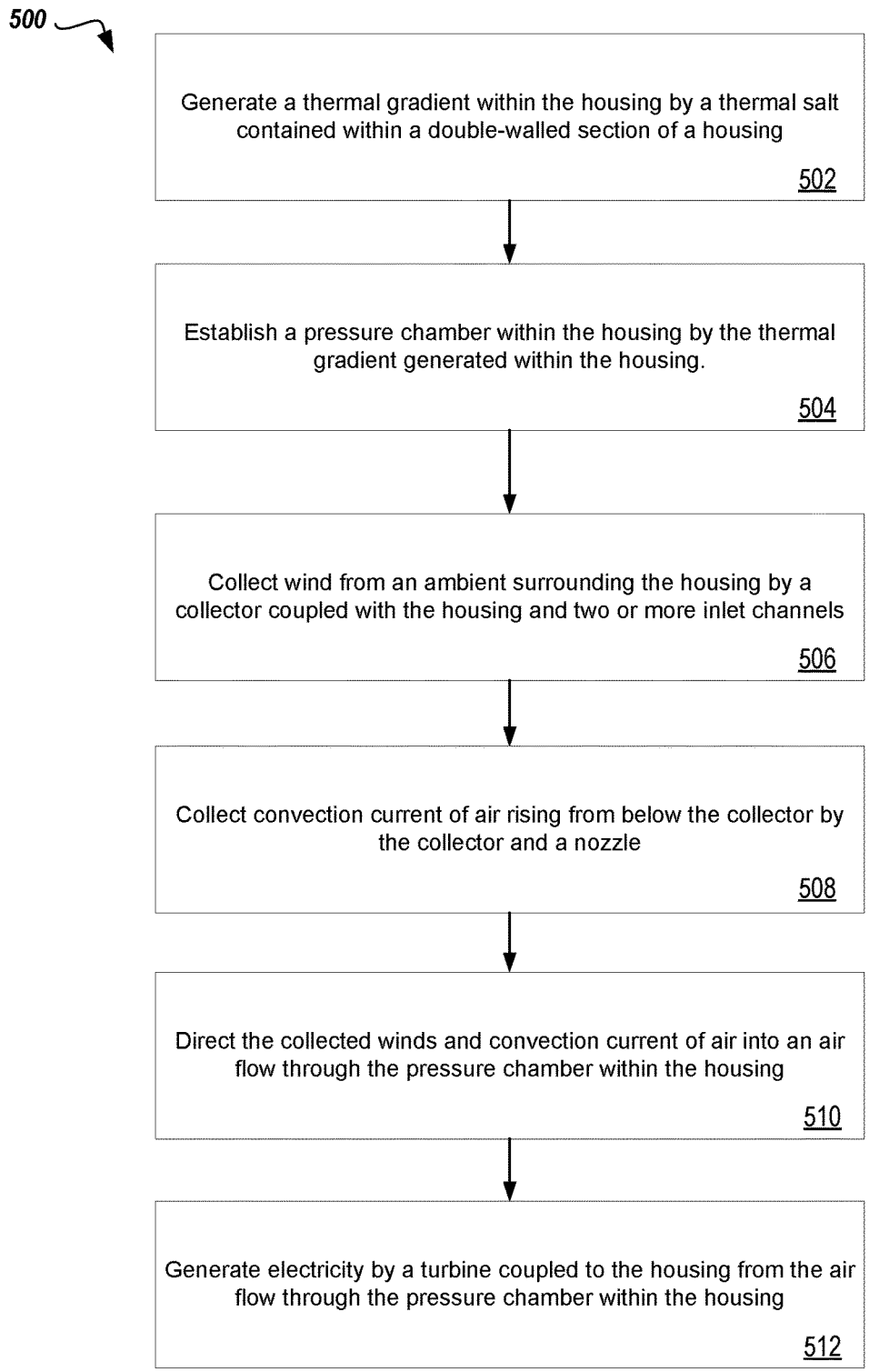
FIG. 5 is a flow diagram of an example process of electricity generation by an ambient air and thermal electricity-generation apparatus.

FIG. 5 is a flow diagram of an example electricity generating process 500 by an ambient air and thermal energy electricity-generation apparatus 100. A thermal gradient (e.g., thermal gradient 402) is generated within the housing 102 by a thermal salt 108 that contained within at least a portion of the double-wall portion 104 of the housing 102 (502). The thermal gradient 402 can include a high temperature zone 402a and a low temperature zone 402b. The temperature zones are determined at least in part by a location of the thermal salt 108 within the double-walled portion 104 of the housing 102. A location and magnitude of a thermal gradient 402 can depend on a location and intensity of a thermal radiative source (e.g., the sun, an exhaust from an HVAC system). A position of the sun relative to the apparatus 100 can affect the location of the thermal gradient 402 within the apparatus. Additionally, the magnitude of the thermal gradient can depend on the intensity of the thermal radiation of the sun (e.g., the ambient temperature, the duration of exposure to the sun, etc.). The magnitude of the thermal gradient can depend on a conversion efficiency of heat-to-energy storage (e.g., the phase transition) of the particular thermal salt used.

A pressure chamber (e.g., pressure chamber 110) is established within the housing 102 at least in part by the thermal gradient generated within the housing 102 (504). A magnitude of the pressure differential (e.g., from high-pressure zone 406 to low pressure zone 408) within the pressure chamber 110 can depend in part on a magnitude of the thermal gradient 402. For example, a large thermal gradient 402 within housing 102 results in a larger pressure differential in the pressure chamber 110 than a small thermal gradient 402. In some implementations, a high-pressure differential in the pressure chamber 110 results in increased airflow past the turbine 120.

Airflow is collected from ambient air surrounding the apparatus 100 through airflow path 410 by the collector 112 that is coupled with the housing and inlet channels 114 (506). The inlet channels 114 can be defined by collector blades 118 and can be positioned to pull ambient air moving in multiple directions outside the apparatus 100 into the collector 112 of the apparatus 100. In some implementations, ambient air can be naturally derived (e.g., weather related) and/or ambient air can be artificially derived (e.g., exhaust from an HVAC system or other exhaust-producing system).

Airflow is also collected from a convection current of air rising from below the collector 112 through airflow path 412 by the collector 112 (508). Convection currents of air can include building exhaust, geothermal exhaust, HVAC exhaust, or any similar heated airflow. In some implementations, a temperature of the convection currents of air collected by the collector 112 is a high temperature and an ambient temperature surrounding the housing 102 is a low temperature such that the heated air rises through the apparatus 100. Further details regarding sources of convection currents are discussed in further detail with reference to FIG. 6.

Airflow is directed through airflow paths 410 and 412 to the pressure chamber 110 within the housing 102 (510). The airflows passing through the airflow paths 410 and 412 are directed by the collector 112 and the housing 102 towards, and combined in, the pressure chamber 110. The pressure differential established by the thermal gradient 402 in part forces air flow from a bottom portion of the housing to an upper portion of the housing (e.g., flow of air from a high-pressure portion to a low-pressure portion). The combined airflow is directed towards the turbine 120 where the conical nosepiece diverts the airflow around the stator assembly 144 and into the stages of blades of the stator 124 and rotor 122.

The airflow through the blades of the stator 124 is directed away from a central axis of the turbine 120 and towards the housing 102 by the curvature of the blades of the stator 124. Subsequently, the airflow through the blades of the rotor 122 is directed toward the central axis of the turbine 120 and towards the axis defined by the crankshaft 138 by the curvature of the blades of the rotor 122. The respective curvatures of the blades of the stator 124 and the rotor 122 is selected to maximize an amount of torque generated by the direction change of the airflow through the respective stages of the turbine 120. The torque generated by the airflow can then be used to generate electricity by the turbine 120.

Electricity is generated by a turbine (e.g., turbine 120) coupled to the housing 102 from the airflow received from the pressure chamber 110 within the housing 102 (512). As air flows past the blades of rotor 122, the rotor 122 is caused to rotate which turns the attached crankshaft 138. Crankshaft 138 in turn is coupled to an electrical generator 140 (e.g., a set of magnets 134 and coils 136) which inductively generates electricity as the crankshaft rotates with respect to the stationary stator 124.

In some implementations, the electrical generator 140 is electrically connected (e.g., by wire leads) directly or indirectly to an energy storage device (e.g., a battery) and/or to an electrically-driven apparatus or device (e.g., a computer, HVAC, a water pump, etc.). A junction box and/or transformer can be electrically connected to the electrical generator to regulate power output of the apparatus 100.

Example Operating Environments

Figure 6:
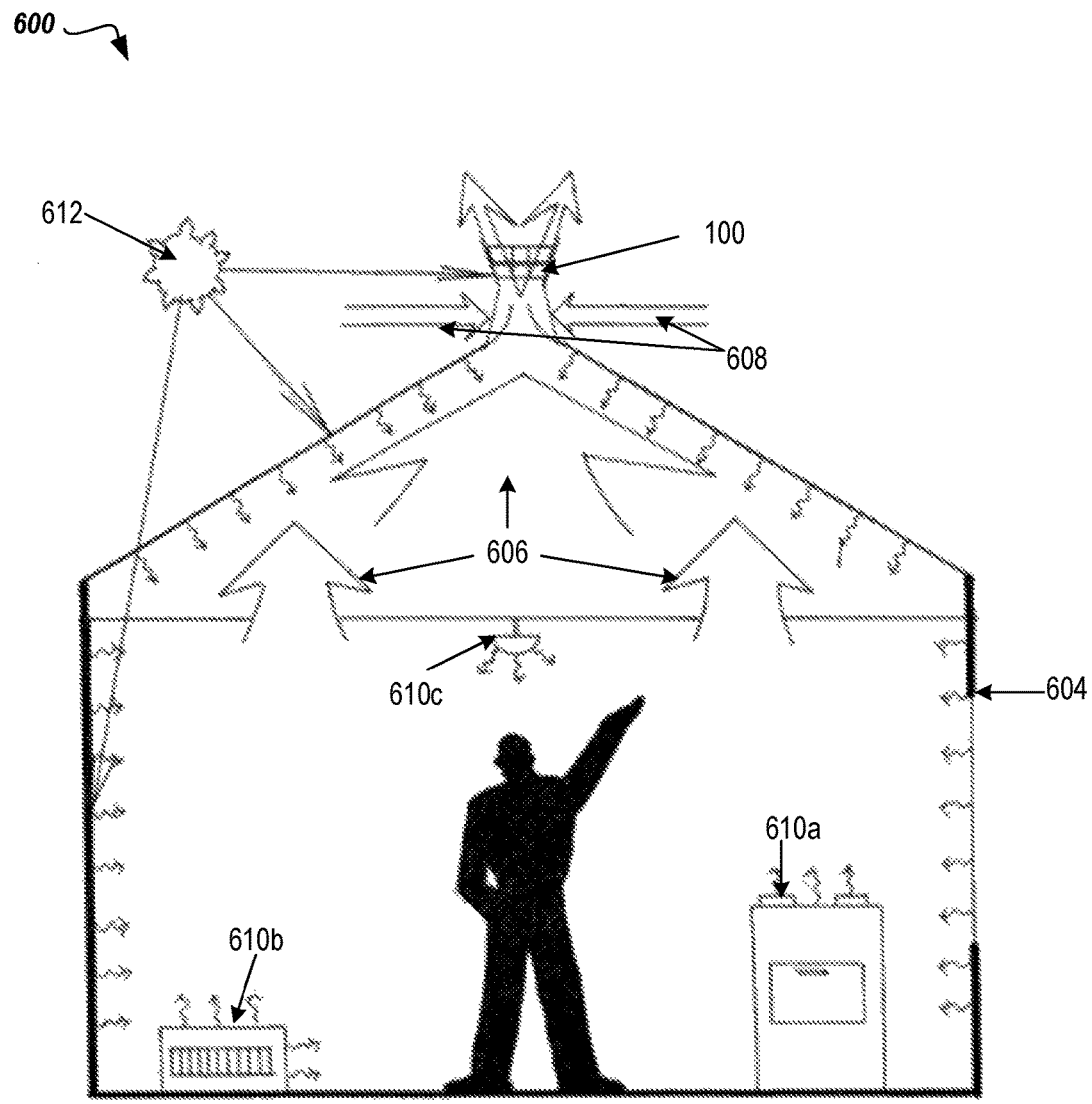
FIG. 6 shows an example operating environment of an ambient air and thermal electricity-generation apparatus.

FIG. 6 shows an exemplary operating environment 600 of an ambient air and thermal electricity-generation apparatus 100. In this example, apparatus 100 is installed on a portion of the roof of a building 604. Air inside the building 604 can flow towards apparatus 100 as indicated by arrows 606. The airflow indicated by arrows 606 can flow through one or more openings (e.g., vents) in the ceiling of building 604 such that heated air rising within the building 604 can escape through the roof. As shown in FIG. 6, heat sources 610 inside the housing environment can include stovetop 610a, radiator 610b, light source 610c, human activity, and the like. Additionally, ambient air can flow towards apparatus 100 as indicated by arrows 608, for example. A thermal energy source 612 (e.g., the Sun) can heat the building 604 and the apparatus 100 such that thermal gradients are generated as discussed with reference to FIG. 4. The apparatus 100 can collect airflow as indicated by arrows 606 and 608 and generate electricity as described with reference to FIGS. 1A-B, 4, and 5.

An ambient air and thermal electricity-generation apparatus 100 can also be installed in other environments. For example, an ambient air and thermal electricity-generation apparatus 100 can be installed on the roof of a multi-level building, commercial building, residential building, factory, etc. In another example, an ambient air and thermal electricity-generation apparatus 100 can be installed over a geothermal vent such that the exhaust of the geothermal vent is collected to generate electricity. The ambient air and thermal electricity-generation apparatus can be scaled for any application. For example, the ambient air and thermal energy electricity-generation apparatus can be used for small-scale installations (e.g., for a single-housing dwelling) and largescale installations (e.g., commercial).

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An electricity generating apparatus comprising:
a housing comprising a double-walled section containing at least a thermal salt to store heat so as to form a pressure chamber within the housing;
a collector coupled with the housing and comprising two or more inlet channels and a nozzle, wherein the inlet channels are configured and arranged to direct ambient air into the pressure chamber within the housing, and the nozzle is configured and arranged to direct a convection current of air rising from below the apparatus into the pressure chamber within the housing; and
a turbine to generate electricity from air flow through the pressure chamber, the turbine being coupled with the housing and comprising a rotor and a stator, wherein the rotor comprises an aerodynamic rotor case and convergent blades around the aerodynamic rotor case, and the stator comprises an aerodynamic stator case and divergent blades around the aerodynamic stator case;
wherein the double-walled section containing at least the thermal salt surrounds at least a portion of the collector, and the double-walled section containing at least the thermal salt surrounds at least a portion of the turbine.

2. The apparatus of claim 1, wherein the turbine comprises two or more magnets and two or more coils oriented with respect to each other to generate the electricity as the rotor rotates with respect to the housing and the stator, and the two or more magnets and two or more coils are located within the aerodynamic stator case and are coaxial with the stator.

3. The apparatus of claim 1, wherein the divergent blades of the stator are a first number of blades, the convergent blades of the rotor are a second number of blades, the rotor is coaxial with the stator, and the first number and the second number are two sequential numbers in the Fibonacci sequence.

4. The apparatus of claim 3, wherein the first number of blades is 8 blades, and the second number of blades is 13 blades.

5. The apparatus of claim 1, wherein the divergent blades of the stator are a first number of blades, the convergent blades of the rotor are a second number of blades, and a ratio of the second number of blades to the first number of blades ranges between 1.5-2.0.

6. The apparatus of claim 5, wherein a spacing between a top edge of a divergent blade of the divergent blades of the stator and a bottom edge of a nearest convergent blade of the convergent blades of the rotor is equal to a length of the divergent blade divided by an integer multiple of the Golden Ratio.

7. The apparatus of claim 1, wherein the turbine comprises a crankshaft coupled with the rotor, and wherein the aerodynamic stator case contains an electric generator to generate the electricity, and the aerodynamic stator case also contains a gearbox coupling the crankshaft with the electric generator.

8. The apparatus of claim 7, wherein gearing of the gearbox is selectable responsive to an estimate of airflow through the pressure chamber.

9. The apparatus of claim 7, wherein gearing of the gearbox is selectable responsive to an estimate of a thermal gradient within the pressure chamber.

10. The apparatus of claim 1, wherein a stator assembly comprises a conical nosepiece, and exterior walls of (i) the conical nosepiece, (ii) the stator case, and (iii) the rotor case, each form an angle with a vertical direction of the apparatus that is an integer multiple of 15 degrees.

11. The apparatus of claim 10, wherein the housing has a hourglass shape, and wherein the doubled-walled section of the housing has interior walls that each form an angle that is an integer multiple of 15 degrees.

12. The apparatus of claim 11, wherein the portion of the double-walled section of the housing containing thermal salt extends from a point below a smallest circumference of the hourglass shape of the housing to a point above the smallest circumference of the hourglass shape of the housing.

13. The apparatus of claim 12, wherein the double-walled section containing at least a thermal salt is configured such that heat is generated when solar radiation impinges upon the double-walled section of the housing and is stored in the thermal salt.

14. The apparatus of claim 12, wherein the portion of the double-walled section containing the thermal salt is selected to generate a thermal gradient within at least a portion of the housing, and wherein the thermal salt is a Glauber's salt.

15. The apparatus of claim 1, wherein the two or more inlet channels are defined by collector blades arranged and configured to form the two or more inlet channels.

16. A method for generating electricity comprising:
    generating, by a thermal salt contained within a double-walled section of a housing, a thermal gradient within the housing, the generating of the thermal gradient including:
        absorbing thermal energy by the thermal salt contained within the double-walled section of the housing;
        storing the thermal energy by the thermal salt through a first phase transition from a solid to a liquid; and
        releasing the stored thermal energy by the thermal salt through a second phase transition from liquid to solid;
    establishing, by the thermal gradient generated within the housing, a pressure chamber within the housing;
    collecting, by a collector coupled with the housing and two or more inlet channels, ambient air from an ambient surrounding the housing;
    collecting, by the collector coupled with the housing and a nozzle, a convection current of air rising from below the collector;
    directing, by the collector, the two or more inlet channels, and the nozzle, the collected ambient air and convection current of air into an air flow through the pressure chamber within the housing; and
    generating, by a turbine coupled with the housing and comprising a rotor and a stator, electricity from the air flow through the pressure chamber within the housing, wherein the rotor comprises an aerodynamic rotor case and convergent blades around the aerodynamic rotor case, and the stator comprises an aerodynamic stator case and divergent blades around the aerodynamic stator case, and wherein the double-walled section containing at least the thermal salt surrounds at least a portion of the collector, and the double-walled section containing at least the thermal salt surrounds at least a portion of the turbine.

* * * * *